United States Patent
Chou et al.

(10) Patent No.: US 10,430,342 B2
(45) Date of Patent: Oct. 1, 2019

(54) OPTIMIZING THREAD SELECTION AT FETCH, SELECT, AND COMMIT STAGES OF PROCESSOR CORE PIPELINE

(71) Applicant: Oracle International Corporation, Redwood City, CA (US)

(72) Inventors: Yuan Chou, Los Gatos, CA (US); Gideon Levinsky, Cedar Park, TX (US); Manish Shah, Austin, TX (US); Robert Golla, Austin, TX (US); Matthew Smittle, Allen, TX (US)

(73) Assignee: Oracle International Corporation, Redwood Shores, CA (US)

( * ) Notice: Subject to any disclaimer, the term of this patent is extended or adjusted under 35 U.S.C. 154(b) by 306 days.

(21) Appl. No.: 14/945,054

(22) Filed: Nov. 18, 2015

(65) Prior Publication Data

US 2017/0139706 A1    May 18, 2017

(51) Int. Cl.
*G06F 12/0875* (2016.01)
*G06F 9/38* (2018.01)

(52) U.S. Cl.
CPC ........ *G06F 12/0875* (2013.01); *G06F 9/3851* (2013.01); *G06F 2212/452* (2013.01)

(58) Field of Classification Search
None
See application file for complete search history.

(56) References Cited

U.S. PATENT DOCUMENTS

| | | | | |
|---|---|---|---|---|
| 7,185,178 B1 * | 2/2007 | Barreh | ................. | G06F 9/3802 |
| | | | | 712/206 |
| 7,536,689 B2 | 5/2009 | Mangan | | |
| 7,627,864 B2 | 12/2009 | Du | | |
| 7,657,891 B2 | 2/2010 | Jensen | | |
| 8,041,754 B1 * | 10/2011 | Marr | ..................... | G06F 9/4881 |
| | | | | 707/899 |
| 8,151,268 B2 | 4/2012 | Jones | | |
| 8,225,034 B1 * | 7/2012 | Golla | ................. | G06F 12/0893 |
| | | | | 711/109 |
| 9,207,944 B1 * | 12/2015 | Laudon | ................. | G06F 9/3867 |
| 2008/0263325 A1 * | 10/2008 | Kudva | ................. | G06F 9/3851 |
| | | | | 712/203 |
| 2010/0082945 A1 * | 4/2010 | Adachi | ................. | G06F 9/3851 |
| | | | | 712/200 |
| 2010/0100708 A1 * | 4/2010 | Ukai | ..................... | G06F 9/3851 |
| | | | | 712/205 |
| 2011/0055838 A1 | 3/2011 | Moyes | | |
| 2013/0086365 A1 * | 4/2013 | Gschwind | ........... | G06F 9/30072 |
| | | | | 712/220 |

(Continued)

*Primary Examiner* — George Giroux
(74) *Attorney, Agent, or Firm* — Meyertons, Hood, Kivlin, Kowert & Goetzel, P.C.

(57) ABSTRACT

An apparatus includes a buffer configured to store a plurality of instructions previously fetched from a memory, wherein each instruction of the plurality of instructions may be included in a respective thread of a plurality of threads. The apparatus also includes control circuitry configured to select a given thread of the plurality of threads dependent upon a number of instructions in the buffer that are included in the given thread. The control circuitry is also configured to fetch a respective instruction corresponding to the given thread from the memory, and to store the respective instruction in the buffer.

20 Claims, 10 Drawing Sheets

(56) References Cited

U.S. PATENT DOCUMENTS

| | | | |
|---|---|---|---|
| 2013/0089109 A1* | 4/2013 | Mital | H04L 69/22 |
| | | | 370/431 |
| 2013/0124828 A1* | 5/2013 | Chou | G06F 9/383 |
| | | | 712/207 |
| 2014/0109098 A1* | 4/2014 | Sato | G06F 9/3836 |
| | | | 718/102 |
| 2016/0357554 A1* | 12/2016 | Caulfield | G06F 9/3836 |

* cited by examiner

OPTIMIZING THREAD SELECTION AT FETCH, SELECT, AND COMMIT STAGES OF PROCESSOR CORE PIPELINE

BACKGROUND

Field of the Invention

The embodiments herein relate to processors and, more particularly, to a method for thread selection at various stages of a processing pipeline.

Description of the Related Art

Some processors include one or more cores that support multi-threaded instruction execution. In a multi-threaded core, at least some hardware resources within the core may be shared between two or more software threads by assigning the resources to a currently selected thread. The selected thread may change on a given core clock cycle, allowing another thread access to the core's hardware resources. As used herein, a "software thread," "execution thread," or simply "a thread," refers to a smallest portion of a software application or process that may be managed independently by a core. Multi-threaded operation may allow a core to utilize processor resources more efficiently. For example, if an instruction in a first thread is waiting for a result of a memory access, processor resources may be assigned to a second thread rather than waiting for the result.

One particular hardware resource that may be shared is the instruction processing pipeline, or as referred to herein, "the processing pipeline." The processing pipeline of a multi-threaded core may concurrently include instructions for two or more threads. Algorithms for selecting a thread to utilize the core's resources may impact performance of the core.

SUMMARY

Various embodiments of a system, a method and an apparatus are disclosed in which an embodiment of the apparatus includes a buffer configured to store a plurality of instructions previously fetched from a memory, wherein each instruction of the plurality of instructions may be included in a respective thread of a plurality of threads. The apparatus also includes control circuitry configured to select a given thread of the plurality of threads dependent upon a number of instructions stored in the buffer that are included in the given thread. The control circuitry is also configured to fetch a respective instruction corresponding to the given thread from the memory, and to store the respective instruction in the buffer.

In a further embodiment, the number of instructions in the buffer that are included in the given thread is less than a respective number of instructions stored in the buffer that are included in each remaining thread of the plurality of threads. In another embodiment, to select the given thread of the plurality of threads, the control circuitry is further configured to determine a respective mode for each thread, wherein each thread is in one of at least two modes, and to determine a respective number of instructions in the buffer included in each thread of the plurality of threads. The control circuitry is also configured to add a predetermined value to the respective number corresponding to each thread determined to be in a first mode of the at least two modes, and to select the given thread with the smallest respective number.

In one embodiment, to select the given thread of the plurality of threads, the control circuitry is further configured to assign each thread to one of at least two groups dependent upon a respective number of instructions stored in the buffer included in each thread of the plurality of threads, and to select from a first group of the at least two groups, the given thread that has the longest time period since a previous selection. In a further embodiment, the control circuitry is further configured to, in response to a determination that no threads assigned to the first group are eligible for selection, select from a second group of the at least two groups, the given thread that has the longest time period since a previous selection.

In another embodiment, to select the given thread, the control circuitry is further configured to assign each thread of the plurality of threads to one of at least two groups dependent upon a determination if a critical instruction in the buffer is included in the corresponding thread, and to select from a first group of the at least two groups, the given thread that has the longest time period since a previous selection. The first group includes threads that include a critical instruction in the buffer. In an embodiment, the memory corresponds to an instruction cache and the buffer corresponds to a fetch buffer.

BRIEF DESCRIPTION OF THE DRAWINGS

The following detailed description makes reference to the accompanying drawings, which are now briefly described.

Figure 1:
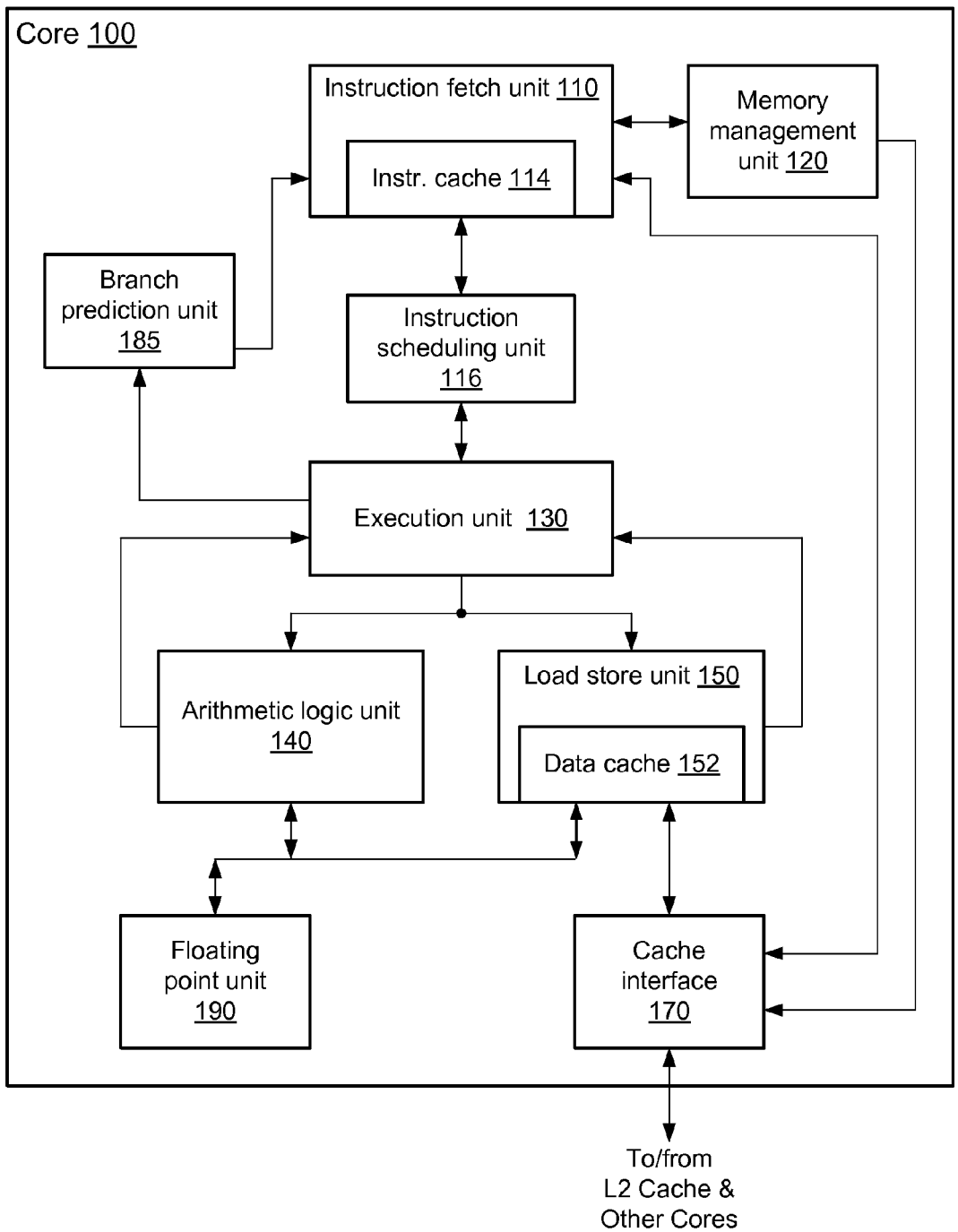
FIG. 1 illustrates a block diagram of an embodiment of a core.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Generally speaking, a processor core (or simply, a "core") may refer to a unit of a processor that is capable of executing program instructions and processing data independently of other cores within the processor, such that multiple cores may execute instructions concurrently. Performance of a processing core may be impacted by a multitude of factors, including processor clock speed, a number of cores included in the processor, and speed of the memory accesses. One method for improving performance is by using cores capable of multi-threaded processing. In a multi-threaded core, two or more threads may share hardware resources within the core by assigning the resources to a currently selected thread, allowing a core to utilize processor resources more efficiently.

The processing pipeline of a multi-threaded core may concurrently include instructions and data for two or more threads. In various embodiments, a processing pipeline may process instructions through multiple stages including, but no limited to, a fetch stage, a select stage, and a commit stage. The fetch stage includes "retrieving" or "fetching" an instruction from an instruction cache or other memory and storing the fetched instruction into a buffer included in the processing pipeline. The select stage includes reading an instruction previously stored in the buffer, decoding the read instruction, and placing the decoded instruction into a pick queue. The commit stage includes removing, from the pick queue, instructions that have executed and, in the case of out-of-order execution, instructions that have also reached their original execution order.

Algorithms for selecting a thread to utilize the core's resources may impact performance of the core. Embodiments of a method for selection of a thread for processing during the different stages of a processing pipeline are contemplated herein.

An embodiment of a core is illustrated in FIG. 1. Core 100 includes instruction fetch unit (IFU) 110, coupled to memory management unit (MMU) 120, branch prediction unit (BPU) 185, cache interface 170, and instruction scheduling unit (ISU) 116. ISU 116 is coupled to execution unit 130. Execution unit 130 is coupled to arithmetic logic unit (ALU) 140, and load store unit (LSU) 150. ASU 140 and LSU 150 are also coupled to send data back to execution unit 130. Both ALU 140 and LSU 150 are coupled to floating point unit (FPU) 190. IFU 110, MMU 120, and LSU 150 are coupled to cache interface 170.

Instruction fetch unit (IFU) 110 may be configured to retrieve instructions for execution in core 100. In the illustrated embodiment, IFU 110 is configured to perform various operations relating to the fetching of instructions from cache or memory, and the decoding of instructions prior to the instructions being issued for execution. Instruction fetch unit 110 includes instruction cache 114, which may correspond to at least a portion of L1 cache 103. In one embodiment, IFU 110 includes logic to maintain fetch addresses (e.g., derived from program counters) corresponding to each thread being executed by core 100, and to coordinate the retrieval of instructions from instruction cache 114 according to those fetch addresses. In one embodiment, IFU 110 is configured to maintain a pool of fetched, ready-for-issue instructions drawn from among each of the threads being executed by core 100. For example, IFU 110 may implement a respective instruction buffer corresponding to each thread in which several recently-fetched instructions from the corresponding thread may be stored.

Instruction scheduling unit (ISU) 116 may be configured to retrieve instructions for execution in core 100. In the illustrated embodiment, ISU 116 is configured to select instructions for various threads from instruction cache 114 for execution. In some embodiments, ISU 116 may be configured to select multiple ready-to-issue instructions and concurrently issue the selected instructions to various functional units without constraining the threads from which the issued instructions are selected. In other embodiments, thread-based constraints may be employed to simplify the selection of instructions. For example, threads may be assigned to thread groups for which instruction selection is performed independently (e.g., by selecting a certain number of instructions per thread group without regard to other thread groups). In some embodiments, ISU 116 may be configured to further prepare instructions for execution, for example by detecting scheduling hazards, arbitrating for access to contended resources, or the like. Moreover, in the present embodiment, ISU 116 supports speculative issuing of instructions, i.e., instructions from a given thread may be speculatively issued by ISU 116 for execution depending on, e.g., a history of code execution by core 100. For example, a load instruction may be speculatively issued by ISU 116 ahead of one or more store instructions that were received previous to receiving the load instruction. ISU 116 may use historical code execution to decide whether or not to issue the load instruction.

Instruction and data memory accesses may involve translating virtual addresses to physical addresses. A translation of mappings may be stored in an instruction translation lookaside buffer (ITLB) or a data translation lookaside buffer (DTLB) for rapid translation of virtual addresses during lookup of instruction cache 114 or data cache 152. In the event no translation for a given virtual address is found in the appropriate TLB, memory management unit 120 may be configured to provide a translation. In one embodiment, MMU 120 may be configured to manage one or more translation tables stored in system memory and to traverse such tables in response to a request for an address translation, such as from an ITLB or DTLB miss. In some embodiments, if MMU 120 is unable to derive a valid address translation, for example if one of the memory pages including a page table is not resident in physical memory (i.e., a page miss), MMU 120 may be configured to generate a trap to allow a memory management software routine to handle the translation.

Branch prediction unit (BPU) 185 may include logic to predict branch outcomes and/or fetch target addresses. BPU 185 may use a Branch History Table (BHT) to track a number of times an instruction branch is taken versus how often the instruction branch is not taken. BPU 185 may also track patterns of taking or not taking a particular branch. Using the data collected in the BHT, BPU 185 may populate a Branch Target Buffer (BTB) with predictions of branches to be taken or not taken.

Execution unit 130 may be configured to process and provide results for certain types of instructions issued from ISU 116. In one embodiment, execution unit 130 may be configured to execute certain integer-type instructions defined in the implemented ISA, such as arithmetic, logical, and shift instructions. It is contemplated that in some embodiments, core 100 may include more than one execution unit 130, and each of the execution units may or may not be symmetric in functionality. Each execution unit 130 may be capable of processing a given thread. In the illustrated embodiment, instructions destined for ALU 140 or LSU 150 pass through execution unit 130. In alternative embodiments, however, it is contemplated that such instructions may be issued directly from ISU 116 to their respective units without passing through execution unit 130.

Arithmetic logic unit (ALU) 140 may be configured to execute and provide results for certain arithmetic instructions defined in the implemented ISA. For example, in one embodiment, ALU 140 implements integer arithmetic instructions, such as add, subtract, multiply, divide, and population count instructions. In one embodiment, ALU 140 implements separate processing pipelines for integer add/ multiply, divide, and Boolean operations, while in other embodiments the instructions implemented by ALU 140 may be differently partitioned.

In the illustrated embodiment, floating point unit 190 is implemented separately from ALU 140 to process floating-point operations while ALU 240 handles integer and Boolean operations. FPU 190 implements single-precision and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. In other embodiments, ALU 140 and FPU 190 may be implemented as a single logic block.

Load store unit 150 may be configured to process data memory references, such as integer and floating-point load and store instructions as well as memory requests that may originate from other blocks within core 100, such as crypto processing unit 160, for example. LSU 150 includes a data cache 152 as well as logic configured to detect cache misses and to responsively request data from an L2 cache via cache interface 170. Data cache 152 may correspond to at least a portion of L1 cache 103. In one embodiment, data cache 152 is configured as a write-through cache in which all stores are written to L2 cache regardless of whether they hit in data cache 152; in some such embodiments, stores that miss in data cache 152 cause an entry corresponding to the store data to be allocated within data cache 152. In other embodiments, data cache 152 is implemented as a write-back cache. Additionally, in some embodiments LSU 150 includes logic configured to translate virtual data addresses generated by execution unit 130 to physical addresses, such as a Data Translation Lookaside Buffer (DTLB). In some such embodiments, virtual addresses are translated into real addresses prior to translation to physical addresses. As used and described herein, a real address corresponds to a location in memory from the perspective of application or other software being executed in core 100.

A number of functional units in the illustrated embodiment of core 100 may be configured to generate memory or I/O requests external to core 100. For example, IFU 110 or LSU 150 may generate access requests to an L2 cache 110 in FIG. 1 in response to their respective cache misses. In the illustrated embodiment, cache interface 170 is configured to provide a centralized interface to the port of an L2 cache 110 on behalf of the various functional units that may generate memory accesses. In one embodiment, cache interface 170 is also configured to receive data returned via an L2 cache 110, and to direct such data to the appropriate functional unit (e.g., data cache 152 for a data cache fill due to miss). Cache interface 170 may, in some embodiments, be coupled to other cores in a multicore processor.

It is noted that, as used herein, "committing" or to "commit" an instruction refers to processing of an instruction including the instruction being executed, completed, and results of the instruction being saved in an appropriate memory and available for use by a subsequent instruction. In some embodiments, to "commit" an instruction is the same as to "retire" an instruction. In the embodiments presented herein, an instruction is not committed until all previously received instructions have been committed. Accordingly, an instruction issued out-of-order may have to wait until the previous instructions are committed before being committed itself.

The embodiment of the core illustrated in FIG. 1 is one of multiple contemplated examples. Other embodiments of a core may include a different number and configuration of components. For example, ALU 140 and FPU 190 may be implemented as a single functional block rather than two separate units.

Figure 2:
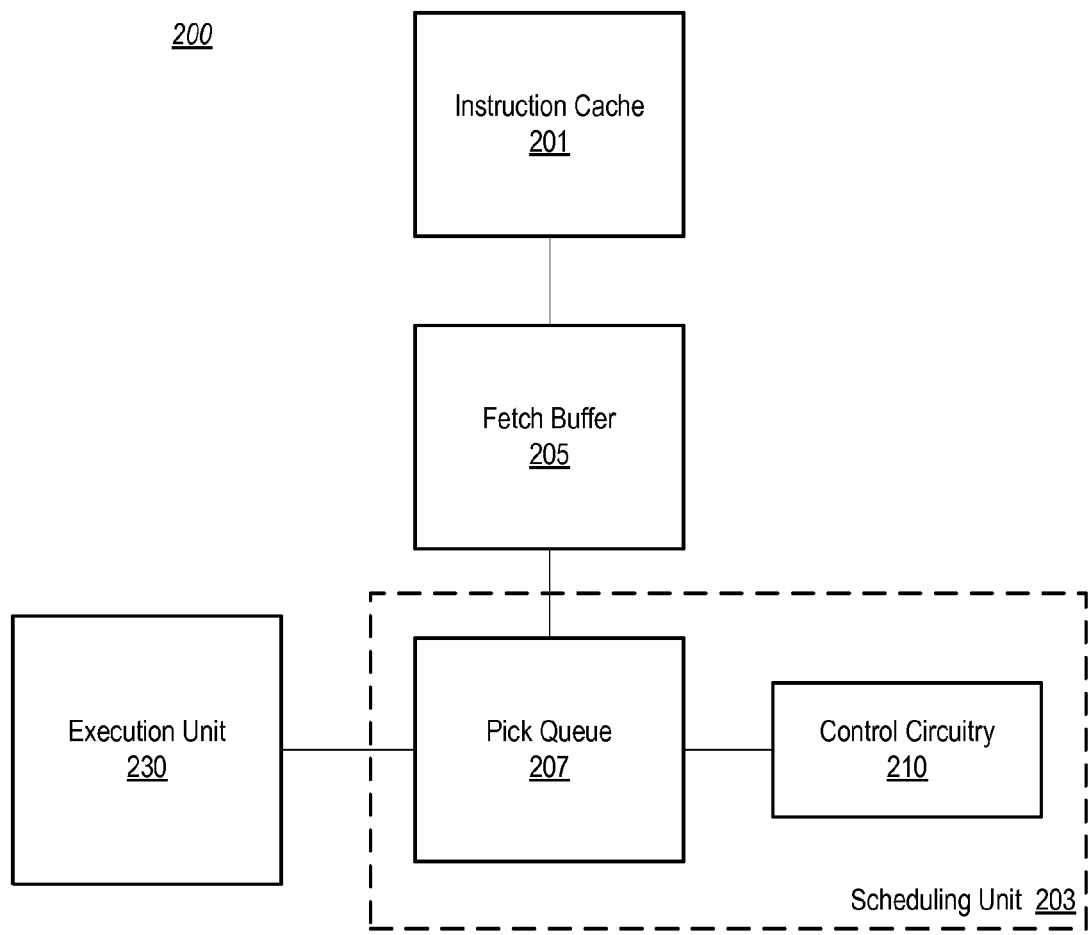
FIG. 2 shows a block diagram of an embodiment of a core's instruction pipeline.

Moving to FIG. 2, a block diagram of an embodiment of a processing pipeline for a multi-threaded core is shown. In various embodiments, processing pipeline 200 may be part of core 100 in FIG. 1 and includes instruction cache 201 coupled to fetch buffer 205. Pick queue 207 is coupled to fetch buffer 205, control circuitry 210, and execution unit 230. Pick queue 207 and control circuitry 210 may be included within scheduling unit 203.

Instruction cache 201 may correspond to instruction cache 114 in FIG. 1 and, in the current embodiment, corresponds to the functional description provided above. Instruction cache 201 may store instructions for a plurality of threads. In the current embodiment, the instructions stored in instruction cache 201 are processed by scheduling unit 203, which, in some embodiments, may correspond to instruction scheduling unit 116 in FIG. 1. Scheduling unit 203 processes instructions in three stages: a fetch stage, a select stage, and a commit stage.

In the fetch stage, fetch buffer 205 fetches and stores an instruction for a selected thread from instruction cache 201. In some embodiments, fetch buffer 205 may include a single memory storing multiple fetch buffers, with each fetch buffer storing instructions for a respective thread. In other embodiments, fetch buffer 205 may include multiple memories, each memory corresponding to a single fetch buffer.

In the select stage, scheduling unit 203 picks an instruction for a second selected thread from fetch buffer 205. The picked instruction is decoded and then stored in pick queue 207. Similar to fetch buffer 205, pick queue 207 may be implemented as a single memory including multiple queues or multiple memories each including a single queue, or some combination thereof. Entries for decoded instructions in pick queue 207 may include additional data bits for attaching one or more tags to track additional information regarding the corresponding instruction, such as, for example, if the instruction has issued and/or completed execution. Execution unit 230, which in some embodiments may correspond to execution unit 130 in FIG. 1, receives a decoded instruction from scheduling unit 203 and executes the decoded instruction. After executing the instruction, execution unit 230 tags the executed instruction in pick queue 207 to signify that it has been executed.

In the commit stage, control circuitry 210 determines that an executed instruction is ready to be committed and removed from pick queue 207. To be committed, one or more conditions corresponding to the instruction may be validated. For example, if a speculative branch occurred in the same thread before the instruction, then the branch may have been predicted correctly. Data used by the executed instruction may be determined to be valid. In a core that supports out-of-order processing, any instructions from the same thread that issued before the executed instruction may be committed before the executed instruction is committed.

In the current embodiment, to support multiple threads, control circuitry 210 selects a thread for processing at each stage. A same thread may be picked for all three stages or control circuitry 210 may select threads for each stage independently. In various embodiments, a thread may remain selected for a single processing cycle or for any suitable number of cycles. The method by which threads are selected may determine how efficiently resources of the multi-threaded core are utilized, and, therefore, may impact performance of the core. For example, some multi-threaded cores may use a round robin or a least recently used method for selecting a thread for processing. Each of these methods may provide an equal chance for a given thread to be selected and, therefore, provide equal opportunities to access the core resources for each thread. These methods, however, may not always provide the best utilization of the core's resources. For instance, if a speculative branch in a given thread is mispredicted and the instructions for that thread are flushed, then the given thread's buffers and queues may be empty, slowing execution of the given thread as its buffers and queues are refilled only during cycles that the given thread is selected. Other selection methods will be presented below It is noted that FIG. 2 is merely an example. Although fetch buffer 205 and pick queue 207 are shown as part scheduling unit 203, each may be separate from, but coupled to, scheduling unit 203. Additional functional units may be included in other embodiments.

Figure 3:
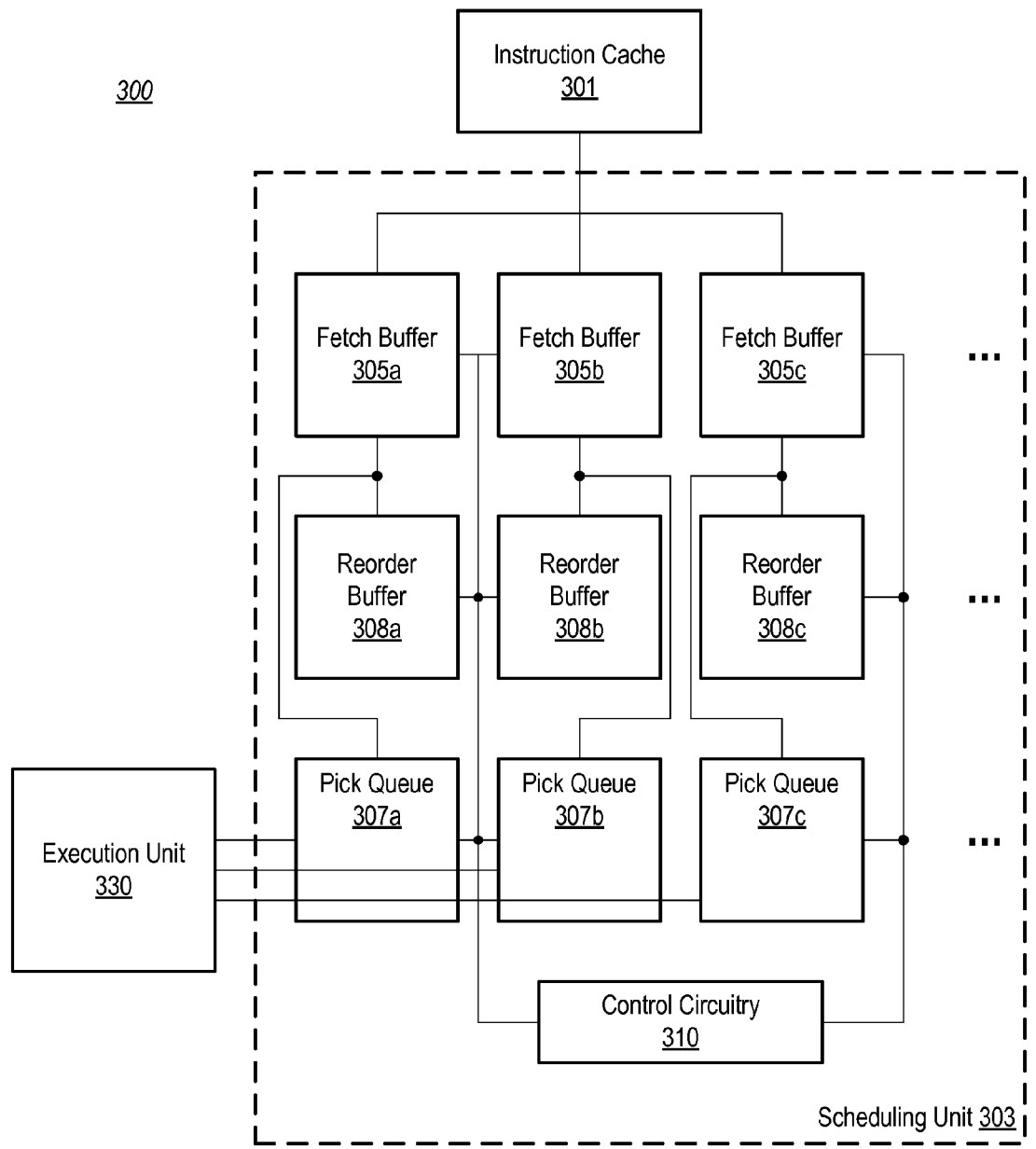
FIG. 3 illustrates a block diagram of another embodiment of a core's processing pipeline.

Turning now to FIG. 3, a block diagram of another embodiment of a processing pipeline for a multi-threaded core is illustrated. Processing pipeline 300 includes instruction cache 301 coupled to fetch buffers 305a through 305c. Pick queues 307a through 307c are coupled to respective fetch buffers 305a through 305c, which are, in turn coupled to respective reorder buffers 308a through 308c. Reorder buffers 308 through 308c are each coupled to execution unit 330. Control circuit 310 is coupled to each of fetch buffers 305a through 305c, pick queues 307a through 307c, and reorder buffers 308a through 308c. In some embodiments, instruction cache 301 may correspond to instruction cache 114, scheduling unit 303 may correspond to instruction scheduling unit 116, and execution unit 330 may correspond to execution unit 130, each illustrated in FIG. 1.

During operation of processing pipeline 300, instruction cache 301 functions essentially as described in reference to instruction cache 201. Scheduling unit 303 is illustrated with three fetch buffers 305a through 305c, although more than three may be implemented in other embodiments. In the fetch stage, each fetch buffer 305 corresponds to a respective thread being processed by scheduling unit 303. When a given thread is selected for processing, the corresponding fetch buffer 305 retrieves an instruction included in the thread from instruction cache 301.

In the select stage, one of pick queues 307, corresponding to a thread chosen for the select stage, retrieves an instruction from the corresponding fetch buffer 305. For example, if pick queue 307b corresponds to the chosen thread, then an instruction is retrieved from fetch buffer 305b. The retrieved instruction is decoded and stored in pick queue 307b, ready for execution by execution unit 330.

In the illustrated embodiment, out-of-order execution of instructions is supported by the multi-threaded core. Instructions may be stored in and fetched from memory in what is referred to herein as "program order." "Out-of-order" execution refers to a core capable of executing instructions of a given thread in an order other than the program order. Such reordering, may allow for increased efficiency or performance by executing more recent instructions when an older instruction is delayed, for example, by a memory access to a system memory. Instructions picked for execution and placed into one of pick queues 307 may be arranged in an order for execution, and may therefore be out of the original program order in which they were fetched. Reorder buffers 308 are utilized to track the selected instructions in the original program order. Returning to the example, the retrieved instruction placed in pick queue 307b is concurrently placed in reorder buffer 308b relative to its original program order.

Execution unit 330 receives an instruction from scheduling unit 303 for a currently selected thread and upon successful execution of the instruction, indicates that the instruction has executed, at which time the instruction is deallocated from the respective pick queue 307. In the commit stage, scheduling unit 303 commits an executed instruction corresponding to a thread currently selected for the commit stage. A given instruction is committed after being executed once all prior instructions to the given instruction in program order have committed. When the given instruction is committed, it is removed from the corresponding reorder buffer 308.

As described above in regards to FIG. 2, a same thread may be picked for all three stages concurrently or control circuitry 210 may select threads for each stage independently. A thread may remain selected for one or more processing cycles. The process for selecting a thread for a given stage may include determining a number of instructions in one or more of the fetch buffers 305, pick queues 307, and reorder buffers 308.

In an example embodiment, for the fetch stage, control circuitry 310 may determine a number of instructions in each fetch buffer 305 for each of the eligible threads. Ineligible threads may include, for example, threads that have recently experienced a cache miss or threads whose fetch buffers are full. The eligible thread with the fewest instructions in its corresponding fetch buffer 305 is selected. If two or more threads are tied for the fewest instructions, then the thread among the tied threads that has gone the longest without being selected is selected. A similar process may be used for the select stage. In the select stage, a number of instructions in pick queues 307 and/or reorder buffers 308 are used rather than the number of instructions in fetch buffers 305. Again, the thread with the fewest number of instructions in its respective pick queue 307 or reorder buffer 308 is selected and ties may be resolved in a similar manner as just described.

By incorporating the number of instructions in fetch buffers 305, pick queues 307, or reorder buffers 308, threads whose buffers and queues have been flushed may be replenished more quickly, which may boost performance of the core. In addition, threads that are executing more efficiently may continue their efficient execution without stalling due to empty buffers.

For the commit stage, in the example embodiment, a different process is used to select a thread. Threads are categorized into a high priority group and a normal priority group. The thread from the high priority group that has gone the longest without being selected is selected. If none of the threads in the high priority group are eligible, then the same method is used on the normal priority group.

In some embodiments, threads may be assigned to the high priority group if the thread has one or more critical instructions ready to commit. As used herein, a "critical instruction" includes a branch instruction whose direction or target was mispredicted or an instruction that post-syncs (e.g., subsequent instructions cannot be decoded until this instruction commits). In other embodiments, all threads begin in the normal priority group. A given thread is promoted to the high priority group if a number of cycles the given thread has been ready to commit at least one instruction, but not selected, exceeds a threshold value. In further embodiments, a given thread is promoted to the high priority group if the number of cycles that the given thread has been ready to commit, but not selected, exceeds a threshold value within a predetermined number of cycles.

Threads in the high priority group may be demoted to the normal priority group, in some embodiments, if the thread was not ready to commit for a threshold number of cycles within a predetermined number of cycles. A thread may also be demoted if its next instruction to commit instruction is a pre-sync instruction or part of a pre-sync sequence of instructions (e.g. an instruction or sequence of instructions that must wait for prior instructions to commit before being committed). Another cause for demotion of a thread into the normal priority group may be if the thread experiences an exception or a trap.

It is noted that FIG. 3 is merely an example to demonstrate operation of an embodiment of a processing pipeline. Although three sets of buffers and queues are illustrated, any suitable number of sets of buffers and queues may be included in other embodiments. In some embodiments, reorder buffers 308 may not be included.

Figure 4:
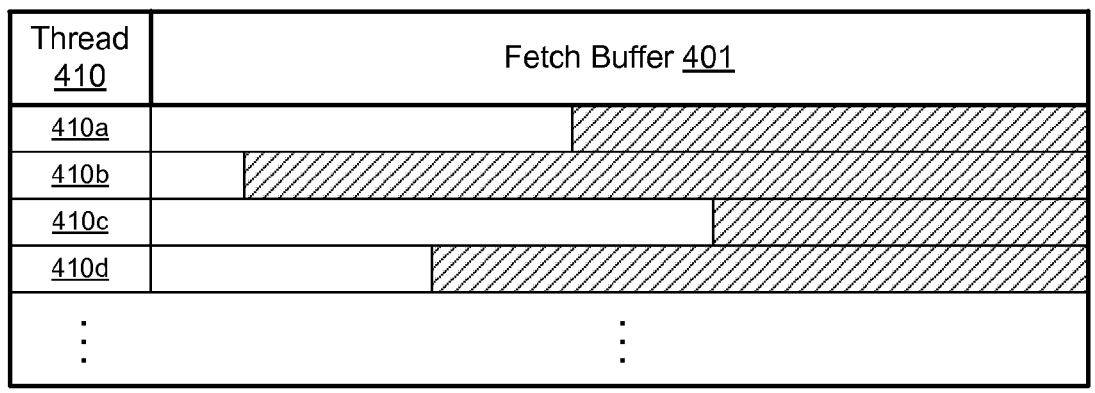
FIG. 4 shows embodiments of a fetch buffer and a thread status table.

Moving now to FIG. 4, embodiments of a fetch buffer and a thread status table for a multi-threaded core are shown. Fetch buffers for four threads, 410a through 410d, are illustrated in fetch buffer 401, although any suitable number of buffers may be included. The hashed portion of the buffer for each thread 410 indicates a filled portion of the respective buffer while the white portion indicates available entries. In some embodiments, fetch buffer 401 may correspond to fetch buffer 205 in FIG. 2, e.g., fetch buffer 401 may correspond to a single memory including a fetch buffer for each respective thread 410. In other embodiments, fetch buffer 401 may correspond to fetch buffers 305 in FIG. 3 collectively, for example, with an individual memory dedicated to a fetch buffer for each respective thread 410.

Thread status table 403 may be included in control circuitry 210 in FIG. 2 or control circuitry 310 in FIG. 3. Four data points are shown in thread status 403 for each of threads 410a through 410d. Fetch buffer size (FB size) 404 indicates a number of instructions currently stored in each of threads 410 respective fetch buffer. Miss look ahead (MLA) mode status 405 designates if a corresponding thread is currently in MLA mode or not. MLA cycles 406 denotes a number of cycles the respective thread 410 has spent in a current MLA mode. Pseudo commit 407 indicates a number of instructs that have pseudo-committed while in MLA mode.

As referred to herein, "miss look ahead" or "MLA" mode refers to a thread status in which the thread has experienced a long latency cache miss and the processor continues to process the thread's subsequent instructions while waiting for the cache miss request to be completed. When a thread is in MLA mode, instructions which are data dependent on long latency cache misses are essentially dropped. In particular, if a branch instruction is dependent on a long latency cache miss, the branch direction and target provided by the branch predictor is assumed to be the actual branch prediction and target. The goal of MLA mode is to uncover as many independent cache misses as possible. An instruction that completes execution and is ready to commit while the thread is in MLA mode is referred to as "pseudo-committed." When the original cache miss request is completed, the thread exits MLA mode, at which point the thread's instructions are flushed from the pipeline and the thread is restarted by re-fetching the instruction corresponding to the original cache miss request. In the current embodiment, a respective MLA 405 entry is "1" while the thread is in MLA mode. A given thread may spend multiple cycles in MLA mode (as indicated by MLA cycles 406) before it exits MLA mode. Prioritizing threads not in MLA mode may be more efficient for a processor since the thread in MLA is performing speculative prefetching rather than executing instructions that have been non-speculatively fetched. Additionally, the longer a thread has been in MLA mode, the less likely that the prefetching it is performing will actually be useful, since a branch instruction that is dependent on a long latency cache miss can send a thread down the incorrect control flow path.

In the embodiment of FIG. 3, a thread selection process is disclosed in which a thread with the fewest number of instructions in its respective fetch buffer is selected for the fetch stage. Referring to fetch buffer 401 and FB size 404, thread 410c has the fewest instructions (200) in its respective fetch buffer 401 and is selected in such a selection process.

In other embodiments, addition information corresponding to threads 410 may be used to select a thread. For example, before FB size 404 is compared for each thread, a determination is made (e.g., by control circuitry 210 or control circuitry 310) if any threads are currently in MLA mode by reading the MLA 405 entries for each eligible thread 410. For threads with corresponding MLA 405 values equal to "1", a predetermined value is added to the respective FB size 404 value, for example, 10. In thread status table 403, therefore, the FB size 404 values for threads 410c and 410d are increased to 30 and 46, respectively. Thread 410a, rather than thread 410c, is selected when using this method.

In another embodiment, in addition to determining if a given thread is in MLA mode, the predetermined value is added to FB size 404 only if MLA cycles 406 is greater than a predetermined threshold value. For example, a threshold value may be set at 28. Thread 410c, therefore, has 10 added to its FB size 404 value (raising the value to 30) while thread 410d retains its FB size 404 value of 36. Thread 410c, since it has been in MLA mode for more cycles than the threshold value, may be at a higher risk of a misprediction than the other threads 410, and, therefore, having its buffers flushed. In an alternate embodiment, instead of basing the decision to add the predetermined value on the values of MLA cycles 406, the decision is based on values of pseudo commit 407. A threshold value may be set to 12 pseudo committed instructions. In the illustrated example, thread 410d has 10 added to its FB size 404 while thread 410c, retains its FB size 404 value of 20 and is selected from the four threads 410 due to having the smallest FB size 404.

Additional embodiments may use values in thread status 403 to categorize or assign each thread 410 into one of two or more groups. For example, threads 410 may be assigned to either a high priority group or a normal priority group. In this example, the high priority group includes threads with a value of FB size 404 lower than a first threshold value and a value of pseudo commit lower than a second threshold value. If the first threshold value is 30 and the second threshold value is 12, then threads 410a and 410c are assigned to the high priority group and threads 410b and 410d are assigned to the normal priority group. When a thread 410 is to be selected, the thread in the high priority group that has gone the longest since being selected is chosen. If thread 410c had previously been chosen, then thread 410a is selected, and vice versa. If neither thread 410a nor 410c is eligible for selection in a given cycle, then an eligible thread in the normal priority group that has gone the longest since being selected is chosen.

It is noted that, although a fetch buffer is illustrated in FIG. 4 and a selection process for the fetch stage is disclosed, the process may also be applied to the select stage. In such an embodiment, either a pick queue or reorder buffer, such as, for example, pick queue 207 in FIG. 2 or reorder buffers 308a-c in FIG. 3, may replace fetch buffer 401, with FB size 404 indicating sizes of the respective pick queues or reorder buffers. Operation of the selection process, otherwise, may occur as described above.

It is also noted that the tables of FIG. 4 are examples for demonstration purposes. Although four threads are illustrated, any suitable number of threads may be included. Thread status table may include different or additional columns from those shown.

Figure 5:
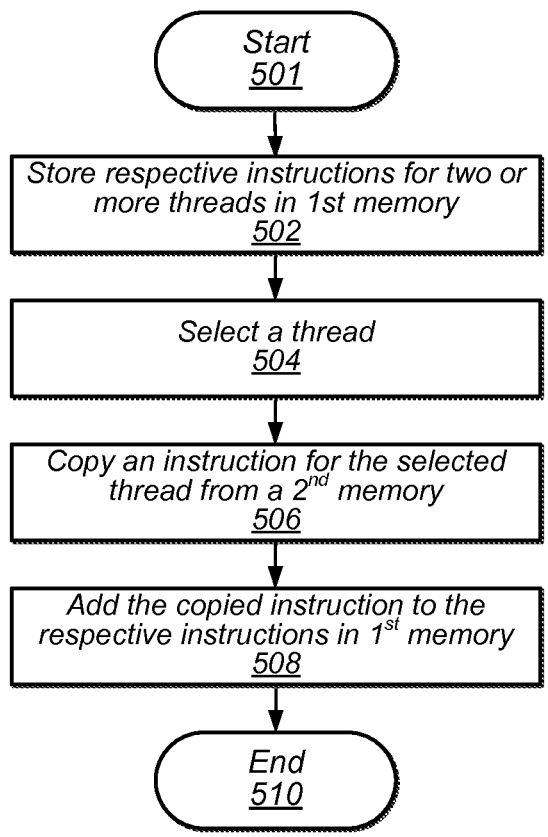
FIG. 5 is a flow diagram illustrating an embodiment of a method for adding an instruction to a processing pipeline.

Turning to FIG. 5, a flow diagram illustrating an embodiment of a method for adding an instruction to a processing pipeline in a multi-threaded core is shown. Method 500 may be applied to a processing pipeline, such as, for example, processing pipeline 200 in FIG. 2 or processing pipeline 300 in FIG. 3. In addition, method 500 may be used during a fetch stage and/or a select stage. Referring collectively to processing pipeline 300 in FIG. 3 and the flow diagram of FIG. 5, method 500 begins in block 501.

Respective instructions for two or more threads are stored in a first memory (block 502). The first memory may correspond to one of fetch buffers 305, pick queues 307, or reorder buffers 308. In various embodiments, the first memory may be implemented as a single memory array including more than one buffer or queue or as multiple memory arrays each including one or more buffers or queues. Each thread of the two or more threads corresponds to a respective buffer or queue in the first memory. Each buffer or queue in the first memory includes an independent number of instructions for the respective thread. The instructions for each thread may be stored in the first memory during normal operation of the multi-threaded core as each thread is processed A thread is selected for processing (block 504). For each processing cycle in the multi-threaded core, an eligible thread is selected for processing for each stage in the processing pipeline. A same or different thread may be selected for each stage. Any suitable selection process may be used for selecting the thread. In the present embodiment, circuitry, such as, e.g., control circuit 310, selects a thread by choosing the eligible thread with the fewest instructions in its respective fetch buffer or pick queue.

An instruction corresponding to the selected thread is copied from a second memory (block 506). If the selected thread is selected for the fetch stage, then the second memory may correspond to instruction cache 301, or any other suitable memory from which instructions may be fetched. If the thread is selected for the select stage, then the second memory corresponds to one of fetch buffers 305.

The copied instruction is stored in the first memory, added to the respective instructions corresponding to the selected thread (block 508). In the fetch stage, the copied instruction is added to the fetch buffer corresponding to the selected thread. In the select stage, the copied instruction may be decoded first, and then the decoded instruction added to the respective pick queue and reorder buffer for the selected thread. The method ends in block 510.

It is noted that the method illustrated in FIG. 5 is an example embodiment. Although the operations illustrated in method 500 are depicted as being performed in a sequential fashion, in other embodiments, some or all of the operations may be performed in parallel or in a different sequence. The illustrated method refers to one embodiment of a thread selection process. Any suitable process for selection of a thread may be implemented, and various other methods will be disclosed below.

Figure 6:
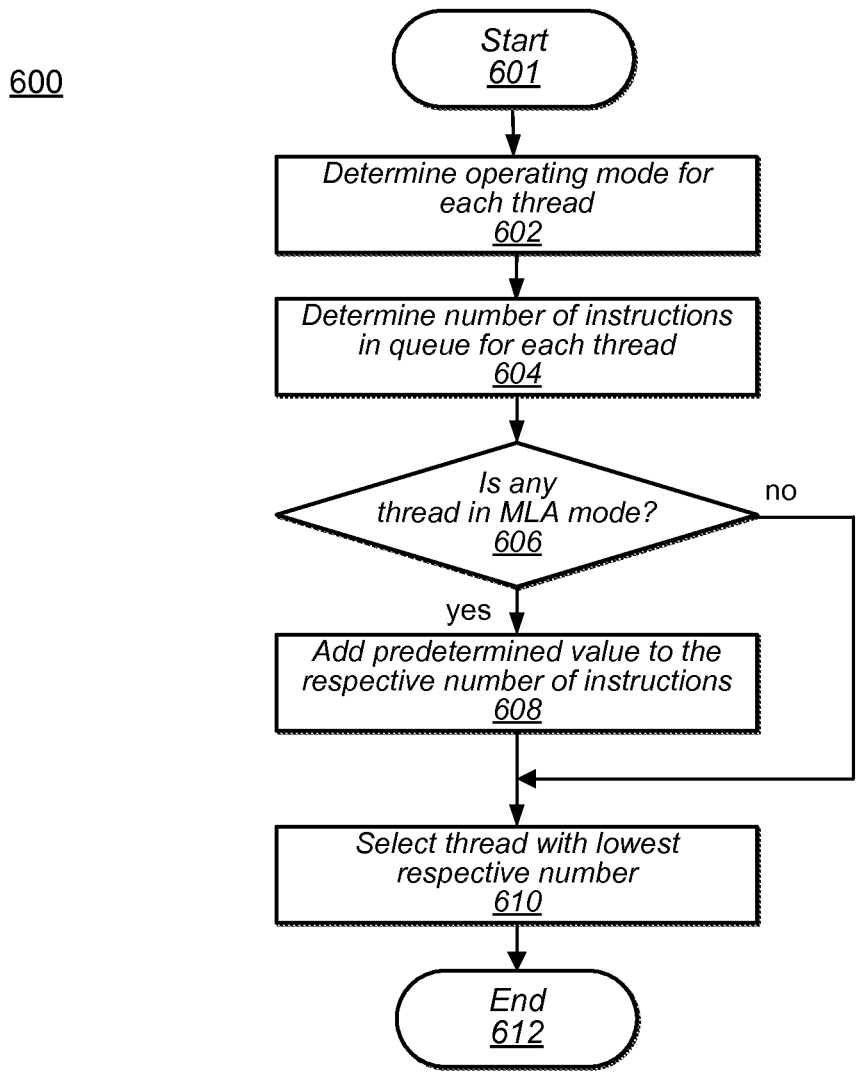
FIG. 6 illustrates a flow diagram of an embodiment of a method for selecting a thread dependent on an operating mode of the thread.

Moving to FIG. 6, a flow diagram of an embodiment of a method for selecting a thread dependent on an operating mode of the thread is illustrated. Method 600 discloses another process for selecting a thread for processing in a multi-threaded core. Similar to method 500, method 600 may be applied to a processing pipeline, such as, for example, processing pipeline 200 in FIG. 2 or processing pipeline 300 in FIG. 3. Method 600 may correspond to block 504 of method 500, and may be used during a fetch stage and/or a select stage of the processing pipeline. Referring collectively to processing pipeline 300 in FIG. 3 and the flow diagram of FIG. 6, method 600 begins in block 601.

Circuitry determines an operating mode for each thread (block 602). The circuitry, such as, for example, control circuitry 310, determines a current operational mode for each thread. In the present embodiment, each thread operates either in a normal operating mode or, for example, after a long latency cache miss, in a miss look ahead (MLA) mode. Control circuitry 310 may store values corresponding to each thread's operating mode in a memory or register, such as, e.g., thread status table 403 in FIG. 4.

Control circuitry 310 determines a number of instructions in a buffer corresponding to each thread (block 604). Control circuit 310 may use any suitable method for determining a number of instructions in each buffer. For example, addresses for the first and last entries in the buffer may be compared. In other embodiments, a count value may be incremented when an instruction is added to the buffer and decremented when an instruction is removed from the buffer. The respective instruction counts may be stored in a memory such as thread status table 403.

Further operations of the method may depend upon the operational mode of each thread (block 606). Control circuitry 310 reviews the status for each thread and determines if any threads are in MLA mode. If at least one thread is in MLA mode, then the method moves to block 608 to adjust the respective instruction counts. Otherwise the method moves to block 610 to select a thread.

A predetermined value is added to the instruction count of each thread determined to be in MLA mode (block 608). Control circuitry 310 adds a suitable value to the instruction count of the corresponding thread in MLA mode. In a variation of this embodiment, the predetermined value may be added only if a number of pseudo committed instructions corresponding to the thread in MLA mode exceeds a threshold value. The predetermined value may be selected dependent upon various performance characteristics of the multi-threaded core. In some embodiments, the value may be fixed, while in other embodiments, the value may be set by an operating system or other software running on a processor that includes the multi-threaded core.

Control circuitry 310 selects an eligible thread with the lowest instruction count (block 610). Control circuitry 310 compares the adjusted instruction counts for each thread eligible for selection. The corresponding thread with the lowest instruction count is selected. By adjusting the instruction count values based on the operating mode, threads that are in MLA mode (and therefore may be executing speculatively fetched instructions) receive lower priority than threads that are in normal operating mode. Nevertheless, threads in MLA mode may still be selected if their respective instruction count is the lowest. In the event that two or more threads have the same lowest instruction count, the thread of the two or more threads that has gone the longest without being selected, is selected. This tie-breaking process may also be referred to as selecting the "least recently used" or "LRU" thread. The method ends in block 612.

It is noted that the method illustrated in FIG. 6 is an example for demonstrating the disclosed concepts. Operations are illustrated as occurring in a sequential fashion. In other embodiments, however, some of the operations may be performed in parallel or in a different sequence. Additional operations may be included in some embodiments.

Figure 7:
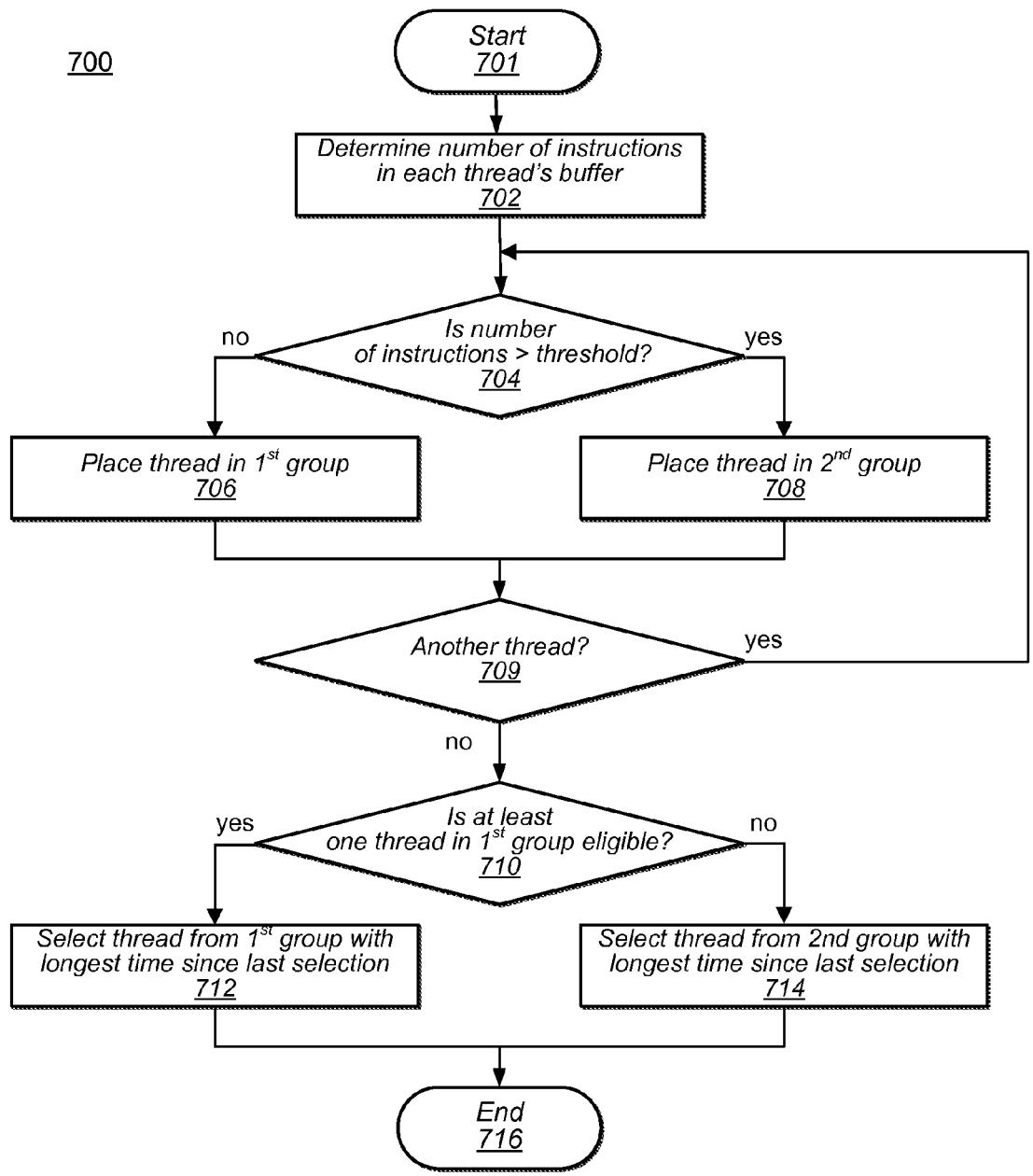
FIG. 7 shows a flow diagram illustrating an embodiment of a method for grouping threads.

Turning now to FIG. 7, a flow diagram illustrating an embodiment of a method for grouping threads is shown. Method 600 may be used in a multi-threaded core as a process for assigning threads to groups from which a given thread is selected for processing. Method 700 may be applied to a processing pipeline, such as, e.g., processing pipeline 200 in FIG. 2 or processing pipeline 300 in FIG. 3. In some embodiments, method 700 may correspond to block 504 of method 500, and may be used during a fetch stage and/or a select stage of the processing pipeline. Referring collectively to processing pipeline 300 in FIG. 3 and the flow diagram of FIG. 7, method 700 begins in block 701.

A control circuit determines a number of instructions in a buffer corresponding to each thread (block 702). In the present embodiment, the control circuit, such as, for example, control circuitry 310, determines an instruction count corresponding to the number of instructions currently in each thread's buffer. The buffer may correspond to one of fetch buffers 305 when selecting a thread for a fetch stage or to one of pick queues 307 or reorder buffers 308 when choosing a thread for the select stage. Each instruction count may be stored in a memory location or a register within control circuitry 310.

In some embodiments, the instruction count of a given thread may be adjusted based on the operational mode of the given thread, such as described in method 600 in FIG. 6. In other embodiments, in addition to determining the instruction count, control circuitry may determine a number of pseudo committed instructions for each thread currently in MLA mode. This pseudo commit count may be stored along with the instruction count.

Further operation of the method may depend upon an instruction count for a given thread (block 704). In the illustrated embodiment, control circuitry 310 reads the instruction count for the given thread. The instruction count is compared to a first threshold value. If the instruction count for the given thread is less than the first threshold, the method moves to block 706 to place the thread in a first group. Otherwise, the method moves to block 708 to place the thread in a second group.

In embodiments in which pseudo commit counts are determined, the pseudo commit count may be compared to a second threshold value. The method moves to block 706 if both the instruction count is less than the first threshold and the pseudo commit count is less than the second threshold. Otherwise, the method moves to block 708. In some embodiments, the first and/or second thresholds may be fixed. In other embodiments, the thresholds may be adjusted dependent upon one or more operating parameters, such as, e.g., a number of threads exceeding the first or second thresholds.

If the instruction count is less than the first threshold, then the given thread is placed into a first group (block 706). The first group, in the present embodiment, corresponds to a high priority group. Threads in this group have fewer instructions in their respective buffers and, therefore, may have improved performance if more instructions are added to their buffers.

If the given thread was not placed in the first group, then the given thread is placed into a second group (block 708). The second group corresponds to a normal priority group. Normal priority threads may include threads with a high number of instructions in their corresponding buffer or threads in MLA mode with a significant number of pseudo committed instructions. These normal priority threads may have a lower performance benefit, or in some cases, a negative performance impact if more instructions are added to their respective buffers.

Further operations of the method may depend upon a number of threads being processed in the multi-threaded core (709). If another thread needs to be assigned to a group, then the method moves to block 704 to place the next thread into an appropriate group. Otherwise, the method moves to block 710 to determine if the first group includes an eligible thread.

Operations of the method may further depend upon the first group (block 710). In the current embodiment, control circuitry 310 determines if at least one thread in the first group of threads is eligible for selection in the current cycle. As previously disclosed, ineligible threads may include, for example, threads that have recently experienced a cache miss or threads whose fetch buffers are full. If at least one thread is eligible, then the method moves to block 712 to select a thread from the first group. Otherwise, the method moves to block 714 to select a thread from the second group.

A thread from the first group is selected if at least one is eligible for selection (block 712). The least recently used (LRU) thread may be selected from among the eligible threads in the first group. The method ends in block 716.

A thread from the second group is selected if no thread from the first group is eligible (block 714). If no thread from the first group is eligible for selection in the current processing cycle, then the LRU thread in the second group is selected. The method ends in block 716.

It is noted that the method illustrated in FIG. 7 is merely an example. Some operations may be performed in a different sequence or in parallel. Additional operations may be included in some embodiments.

Figure 8:
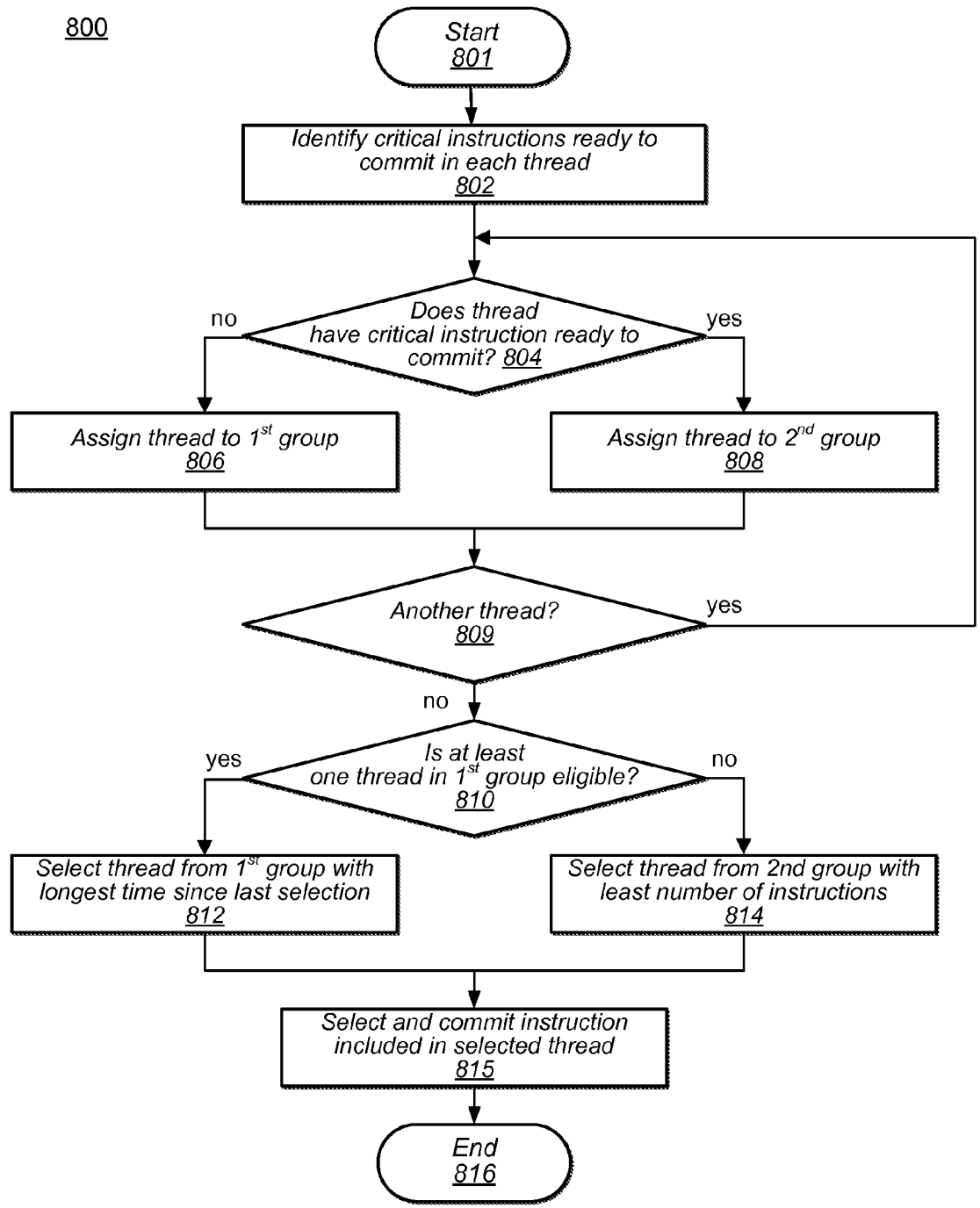
FIG. 8 illustrates a flow diagram of an embodiment of a method for grouping threads during a commit stage.

Moving now to FIG. 8, a flow diagram of an embodiment of a method for grouping threads during a commit stage is illustrated. Method 800 corresponds to a process for selecting a thread in a multi-threaded core, and may be applied to a processing pipeline, such as, for example, processing pipeline 200 in FIG. 2 or processing pipeline 300 in FIG. 3. Referring collectively to processing pipeline 300 in FIG. 3 and the flow diagram of FIG. 8, method 800 begins in block 801.

Critical instructions waiting that are ready to be committed are identified for each thread in the multithreaded core (block 802). A "critical instruction," as referred to herein, refers to an instruction that may, e.g., impact future instructions or future instruction fetches. For example, a branch instruction that had a branch target or direction mispredicted, or an instruction that postsyncs (e.g., subsequent instructions cannot be decoded or reordered until the postsync instruction commits). In the present embodiment, a given thread's instructions that are ready to commit are stored in a respective reorder buffer 308. Control circuitry 310 determines which threads include critical instructions ready to commit. Indications for each thread may be stored in a respective entry in a table in memory or in one or more registers, such as for example, thread status 403 in FIG. 4.

Further operations of the method depend upon a thread including a critical instruction (block 804). In the illustrated embodiment, each reorder buffer 308 is evaluated to see if at least one critical instruction is included and ready to commit. If a given reorder buffer 308 does include a critical instruction waiting to commit, then the method moves to block 706 to include the respective thread in a first group. Otherwise, the method moves to block 708 to include the respective thread in a second group.

A thread including a critical instruction ready to commit is assigned to the first group (block 806). The first group, in the current embodiment, includes all threads being processed by the multi-threaded core that include at least one critical instruction that is ready to commit. The first group may also be referred to as a high priority group.

A thread that does not include a critical instruction ready to commit is assigned to a second group (block 808). The second group includes all threads not in the first group that include an instruction ready to commit. The second group may be referred to as the normal or standard group.

Operations of the method further depend on a number of threads being processed in the multi-threaded core (809). If another thread needs to be assigned to a group, then the method moves to block 804 to assign the next thread into an appropriate group. Otherwise, the method moves to block 810 to determine if the first group includes an eligible thread.

Continuing operations of the method depend upon the first group (block 810). In the current embodiment, control circuitry 310 determines if at least one thread in the first group of threads is eligible for selection in the current cycle of the commit stage. If at least one thread is eligible, then the method moves to block 812 to select a thread from the first group. Otherwise, the method moves to block 814 to select a thread from the second group.

A thread from the first group is selected if at least one is eligible for selection (block 812). The least recently used (LRU) thread may be selected from among the eligible threads in the first group.

A thread from the second group is selected if no thread from the first group is eligible (block 814). If no thread from the first group is eligible for selection in the current processing cycle, then the LRU thread in the second group is selected.

A ready to commit instruction is selected from the reorder buffer 308 corresponding to the selected thread (block 815) and committed. Committing of the instruction may include removing the instruction from its entry in the reorder buffer 308, or, in other embodiments, tagging the instruction for eviction when a new instruction is added to the reorder buffer. The method ends in block 816.

It is noted that the method illustrated in FIG. 8 is an example for demonstrating the disclosed concepts. Additional operations may be included in some embodiments. For example, method 800 includes assigning threads to one of two groups, while other embodiments may include assigning threads to one of three or more groups.

Figure 9:
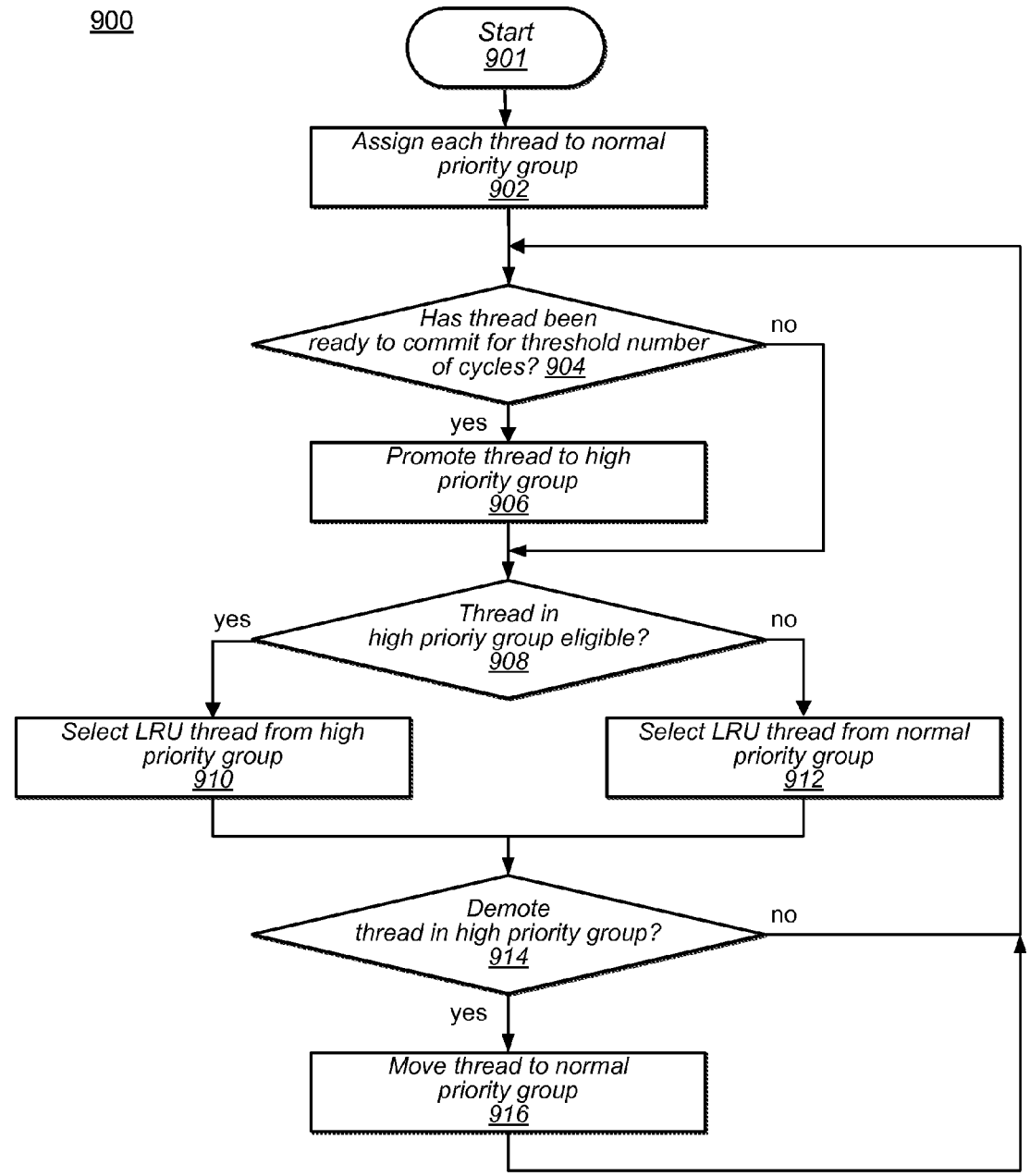
FIG. 9 shows a flow diagram of another embodiment of a method for grouping threads during a commit stage.

Turning to FIG. 9, a flow diagram of another embodiment of a method for grouping threads during a commit stage is illustrated. Method 900 corresponds to a process for selecting a thread in a multi-threaded core. Similar to method 800 in FIG. 8, method 900 may be applied to a processing pipeline, such as, for example, processing pipeline 200 in FIG. 2 or processing pipeline 300 in FIG. 3. Referring collectively to processing pipeline 300 in FIG. 3 and the flow diagram of FIG. 9, method 900 begins in block 901.

Threads are assigned to a normal priority group (block 902). A control circuit, such as, e.g., control circuitry 310 in FIG. 3, assigns threads to a normal priority group. In some embodiments, all threads may initially be assigned to the normal priority group.

Further operation of the method may depend on how long a thread has been ready to commit an instruction (block 904). Control circuitry 310 determines how long each thread has had an instruction ready to commit, but was not selected. In some embodiments, control circuitry 310 may only consider how many cycles a thread has waited to be selected within a most recent number of selection cycles. For example, a given thread may have been eligible for selection for 30 of the 50 most recent cycles. The number of cycles a given thread has been ready, but not selected, is compared to a predetermined threshold value. If at least one thread in the normal priority group has been ready for selection, but not selected for a number of cycles greater than the threshold value, then the method moves to block 906 to promote the appropriate threads. Otherwise the method moves to block 908 to determine if the high priority group includes an eligible thread.

When a given thread in the normal priority group has been ready for selection, but not selected for more than the threshold number of cycles, then the given thread is promoted to the high priority group (block 906). Control circuitry assigns any thread currently in the normal priority group to the high priority group if the thread has been eligible and waiting for selection for more than the threshold number of cycles. In some embodiments, control circuitry may only consider the number of cycles a given thread has waited during a most recent number of processing cycles. For example, a given thread may have waited 60 cycles for selection without being selected, but only 20 of those cycles occur during the most recent 40 processing cycles. In this example, the given thread would have a cycle count of 20 rather than 60.

Continuing operations of the method may depend upon the high priority group (block 908). In the current embodiment, control circuitry 310 determines if at least one thread in the high priority group of threads is eligible for selection in the current cycle of the commit stage. If at least one thread is eligible, then the method moves to block 910 to select a thread from the high priority group. Otherwise, the method moves to block 912 to select a thread from the normal priority group.

A thread from the high priority group is selected if at least one is eligible for selection (block 910). The least recently used (LRU) thread may be selected from among the eligible threads in the high priority group.

A thread from the normal priority group is selected if no thread from the first group is eligible (block 912). If no thread from the high priority group is eligible for selection in the current processing cycle, then the LRU thread in the normal priority group is selected.

Further operations of the method may depend upon threads in the high priority group (block 914). Control circuitry 310 determines if any thread in the high priority group should be demoted to the normal priority group. A given thread may be demoted if it was not eligible for selection for a predetermined number of previous cycles. For example, if a given thread in the high priority group did not have an instruction ready to commit for the previous ten cycles, then control circuitry 310 may tag the thread for demotion to the normal priority group. Additional examples of conditions for demoting a thread include an exception or trap occurs in the thread, or if the next instruction to commit is a pre-synchronization instruction (e.g., an instruction that must wait for one or more other instructions to commit before being committed itself). If control circuitry 310 tags at least one thread for demotion, then the method moves to block 916 to demote the at least one thread. Otherwise, the method moves back to block 904 to determine if a normal priority thread requires promotion to the high priority group.

Threads tagged for demotion are assigned to the normal priority group (block 916). Control circuitry 310 reassigns any thread in the high priority group marked for demotion to the normal priority group. Tagging or marking a thread for demotion may include, in various embodiments, setting an entry in a table such as thread status table 403 in FIG. 4, or maintaining a list of threads to be demoted in a memory or register file. In some embodiments, a thread may be reassigned to the normal priority group upon determining the thread is to be demoted. A demoted thread may be promoted back into the high priority group upon meeting the requirements as disclosed in block 904. The method returns to block 904 to determine if a normal priority thread requires promotion to the high priority group.

It is noted that the method illustrated in FIG. 9 is merely an example. Additional operations may be included in some embodiments. Some operations may be performed in a different sequence or in parallel.

Figure 10:
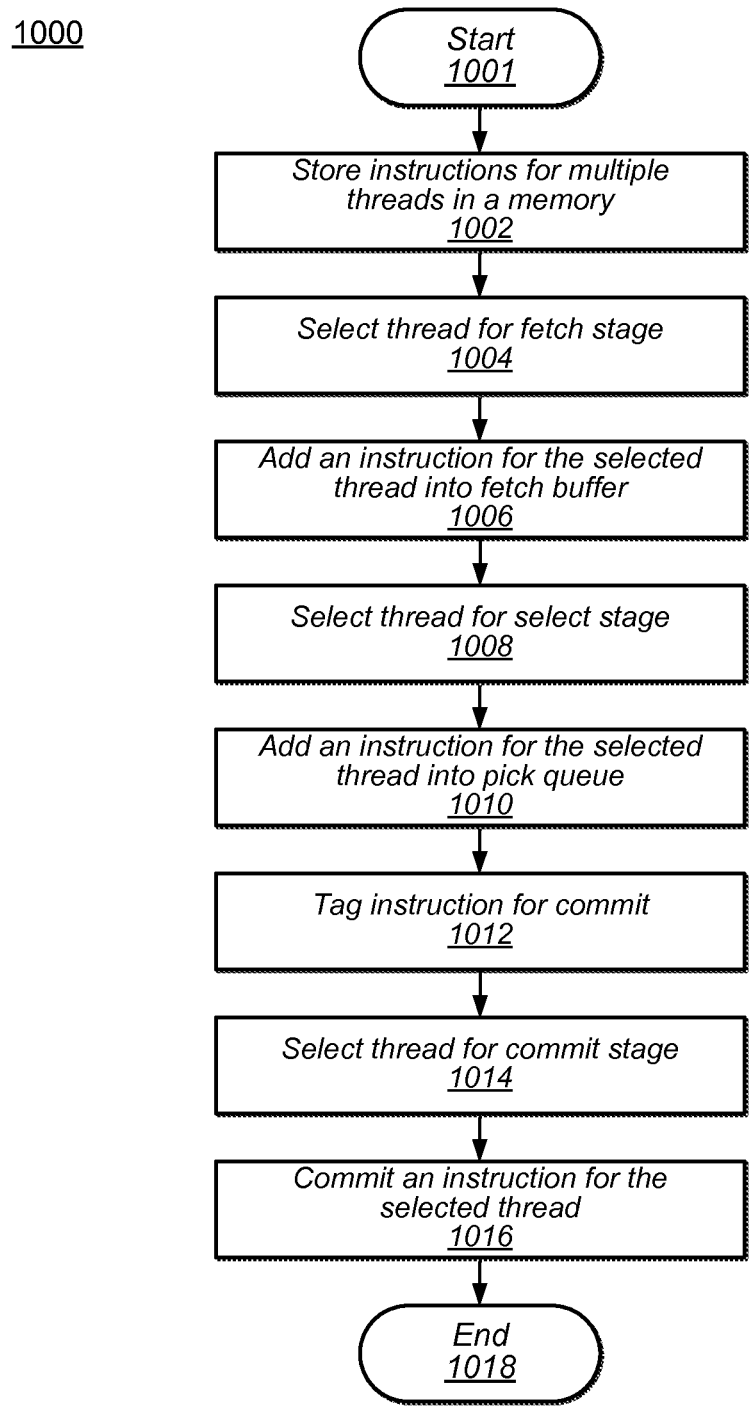
FIG. 10 illustrates a flow diagram of an embodiment of a method for advancing instructions in a processing pipeline.

Moving to FIG. 10, a flow diagram of an embodiment of a method for advancing instructions in a processing pipeline is illustrated. Method 1000 may be applicable to an processing pipeline, such as, for example, processing pipeline 200 in FIG. 2 or processing pipeline 300 in FIG. 3. Referring collectively to processing pipeline 300 in FIG. 3 and the flow diagram of FIG. 10, method 1000 begins in block 1001.

Instructions for multiple threads are stored in a memory (block 1002). In the present embodiment, the memory may correspond to a cache memory, such as, for example, instruction cache 301. Upon an instruction fetch to a memory location that does not correspond to an entry in instruction cache 301, a given cache line is populated with the contents the memory location as well as the contents of nearby memory locations. This process may repeat for instruction fetches for more than one thread, resulting in instruction cache 301 containing instructions for multiple threads.

A thread is selected for processing during a fetch stage (block 1004). An eligible thread is selected for processing for the fetch stage in the processing pipeline. Any suitable selection process, including the processes disclosed herein, may be used for selecting the thread. In the present embodiment, circuitry, such as, e.g., control circuit 310, selects an eligible thread for the fetch stage.

An instruction corresponding to the selected thread is added to a respective fetch buffer (block 1006). The instruction is added to a respective fetch buffer 305 corresponding to the selected thread. Control circuit 310, may additionally update one or more entries in a fetch status table, such as, for example, fetch status table 403 in FIG. 4, including an entry corresponding to the size of the respective buffer.

A thread is selected for processing during a select stage (block 1008). For the select stage, an eligible thread is selected for processing. The thread is selected independently from the thread selected for the fetch stage, and therefore, may or may not correspond to the same thread. Similar to the selection process used in the fetch stage, the process used in the select stage to choose a select thread may correspond to any suitable process, including the processes disclosed herein.

An instruction corresponding to the chosen select thread is added to pick queue 307 and reorder buffer 308 (block 1010). The instruction is moved from the respective fetch buffer 305 corresponding to the chosen select thread, and added to a respective pick queue 307 and reorder buffer 308. In the present embodiment, control circuitry 310 decodes the instruction, and then adds the decoded instruction to the respective pick queue 307 and reorder buffer 308 corresponding to the chosen select thread. Control circuitry 310 may store the decoded instruction in the associated pick queue 307 by placing the decoded instruction among previously stored instructions to be executed in a suitable order that may differ from the program order. Control circuitry 310 may store the decoded instruction in the associated reorder buffer 308 in the program order.

An instruction is tagged for commit (block 1012). After execution of an instruction from one of reorder queues 308, the instruction may be ready to be committed. In some embodiments, the instruction may not be ready to commit until other associated instructions are also executed and committed. In the present embodiment, when the instruction is ready to commit, control circuit 310 writes a value to one or more bits in an entry in the respective reorder queue 308, indicating the instruction is ready to commit.

A thread is selected for the commit stage (block 1014). Control circuitry 310 selects an eligible thread for the commit stage. Any suitable method for selecting the thread may be utilized, such as, for example, method 800 in FIG. 8 or method 900 in FIG. 9. Selection of a thread for the commit stage is independent of the selections of threads for the fetch stage and select stage, and therefore the selected thread may or may not be the same as a thread selected for either the fetch or select stages. The selected commit thread may include one or more critical instructions or may have been eligible and awaiting selection for more than a threshold number of cycles.

An instruction from the selected commit thread is committed (block 1016). If the selected commit thread includes more than one instruction ready to commit, then control circuitry may select a critical instruction to commit or may choose the instruction that has waited the longest to commit. Upon commission, the instruction may be removed from the respective reorder buffer 308 or may be tagged for eviction upon a new instruction being added to the respective reorder buffer 308. The method ends in block 1018.

It is noted that the method illustrated in FIG. 10 is an example for demonstrating the disclosed concepts. Operations are illustrated as occurring in a sequential fashion. In other embodiments, however, some of the operations may be performed in parallel or in a different sequence. Additional operations may be included in some embodiments.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a buffer configured to store a plurality of instructions, each instruction of the plurality of instructions included in a corresponding thread of a plurality of threads; and
control circuitry configured to:
maintain a table of thread status data for the plurality of threads, wherein the table of thread status data includes at least a respective count value that indicates a number of instructions in the buffer for the corresponding thread, and a respective indicator that is asserted if the corresponding thread is in a particular mode due to a cache miss;
in response to a determination that a respective indicator for a particular thread is asserted, adjust the respective count value to decrease a selection priority for the particular thread;
select a given thread of the plurality of threads based on the respective count values;
fetch one or more associated instructions corresponding to the given thread from a memory; and
store the one or more associated instructions in the buffer.

2. The apparatus of claim 1, wherein the control circuitry is further configured to select the given thread with a respective count value that is less than the respective count value corresponding to each remaining thread of the plurality of threads.

3. The apparatus of claim 1, wherein the particular mode corresponds to a miss look ahead mode.

4. The apparatus of claim 1, wherein to select the given thread of the plurality of threads based on the respective count values, the control circuitry is further configured to:
assign each thread to one of at least two groups based on the respective count value corresponding to each thread of the plurality of threads; and
select from a first group of the at least two groups, the given thread that has the longest time period since a previous selection.

5. The apparatus of claim 4, wherein the control circuitry is further configured to, in response to a determination that no threads assigned to the first group are eligible for selection, select from a second group of the at least two groups, the given thread that has the longest time period since a previous selection.

6. The apparatus of claim 1, wherein the control circuitry is further configured to:
assign each thread of the plurality of threads to one of at least two groups based on a determination if a critical instruction in the buffer is included in the corresponding thread;
select from a first group of the at least two groups, a different thread that has the longest time period since a previous selection, wherein the first group includes threads that include a critical instruction in the buffer; and
commit an instruction included in the different thread.

7. The apparatus of claim 1, wherein the memory corresponds to an instruction cache and the buffer corresponds to a fetch buffer.

8. A method comprising:
storing, in a first buffer, a plurality of instructions each of which is included in a corresponding thread of a plurality of threads;
storing, by a control circuit, a table of thread status data for the plurality of threads, wherein the table of thread status data includes at least a respective count value that indicates a number of instructions in the first buffer for the corresponding thread, and a respective indicator that is asserted if the corresponding thread is in a particular mode due to a cache miss;
in response to a determination that a respective indicator for a particular thread is asserted, adjusting the respective count value to decrease a selection priority for the particular thread;
selecting a given thread of the plurality of threads based on the respective count values;
copying a particular instruction in the given thread from a second buffer; and
storing the particular instruction in the first buffer.

9. The method of claim 8, wherein the respective count value corresponding to the given thread is less than the respective count value corresponding to each remaining thread of the plurality of threads.

10. The method of claim 8, wherein the particular mode corresponds to a miss look ahead mode.

11. The method of claim 8, wherein selecting the given thread of the plurality of threads based on the respective count values further comprises:
assigning each thread to one of at least two groups based on the respective count values corresponding to each thread of the plurality of threads; and
selecting from a first group of the at least two groups, the given thread that has the longest time period since a previous selection.

12. The method of claim 11, further comprising, in response to determining that no threads assigned to the first group are eligible for selection, selecting from a second group of the at least two groups, the given thread that has the longest time period since a previous selection.

13. The method of claim 8, wherein selecting the given thread further comprises:
assigning each thread of the plurality of threads to one of at least two groups based on a determination if a critical instruction in the first buffer is included in the corresponding thread;
selecting from a first group of the at least two groups, a different thread that has the longest time period since a previous selection, wherein the first group includes threads that include a critical instruction in the first buffer; and
committing an instruction included in the different thread.

14. The method of claim 8, wherein the first buffer is a reorder buffer and the second buffer is a fetch buffer.

15. A system, comprising:
a first buffer configured to store a first plurality of instructions, each of which is included in a corresponding thread of a plurality of threads;
a second buffer configured to store a second plurality of instructions each of which is included in a corresponding thread of the plurality of threads; and
a control circuit configured to:
track a table of thread status data for the plurality of threads, wherein the table of thread status data includes at least a respective count value that indicates a number of instructions stored in the second buffer for the corresponding thread, and a respective indicator that is asserted if the corresponding thread is in a particular mode due to a cache miss;

in response to a determination that a respective indicator for a particular thread is asserted, adjust the respective count value to decrease a selection priority for the particular thread;

select a given thread of the plurality of threads based on the respective count values; and fetch a particular instruction included in the given thread from the first buffer to the second buffer.

16. The system of claim 15, wherein the control circuit is further configured to:

select a given thread of the plurality of threads based on a number of instructions stored in the first buffer that are included in the given thread;

fetch a particular instruction included in the given thread from a memory; and store the particular instruction in the first buffer.

17. The system of claim 15, wherein the particular mode corresponds to a miss look ahead mode.

18. The system of claim 15, wherein to select the given thread of the plurality of threads, the control circuit is further configured to:

assign each thread to one of at least two groups based on the respective count values corresponding to each thread of the plurality of threads; and select from a first group of the at least two groups, the given thread that has the longest time period since a previous selection.

19. The system of claim 15, wherein to select a given thread of the plurality of threads, the control circuit is further configured to:

assign each thread of the plurality of threads to one of at least two groups based on a determination if a critical instruction in the second buffer is included in the corresponding thread;

select from a first group of the at least two groups, a different thread that has the longest time period since a previous selection, wherein the first group includes threads that include a critical instruction in the second buffer; and commit an instruction included in the different thread.

20. The system of claim 16, wherein the memory corresponds to an instruction cache the first buffer corresponds to a fetch buffer, and the second buffer corresponds to a pick queue.

* * * * *

UNITED STATES PATENT AND TRADEMARK OFFICE
CERTIFICATE OF CORRECTION

PATENT NO. : 10,430,342 B2  
APPLICATION NO. : 14/945054  
DATED : October 1, 2019  
INVENTOR(S) : Chou et al.

Page 1 of 1

It is certified that error appears in the above-identified patent and that said Letters Patent is hereby corrected as shown below:

In the Specification

In Column 1, Line 49, delete "buffer" and insert -- buffer. --, therefor.

In Column 7, Line 18, delete "below" and insert -- below. --, therefor.

In Column 11, Line 37, delete "processed" and insert -- processed. --, therefor.

Signed and Sealed this  
Eighth Day of September, 2020

Andrei Iancu  
*Director of the United States Patent and Trademark Office*